J. P. EAKIN.
ADJUSTABLE SEAT.
APPLICATION FILED APR. 9, 1921.
1,385,742.
Patented July 26, 1921.
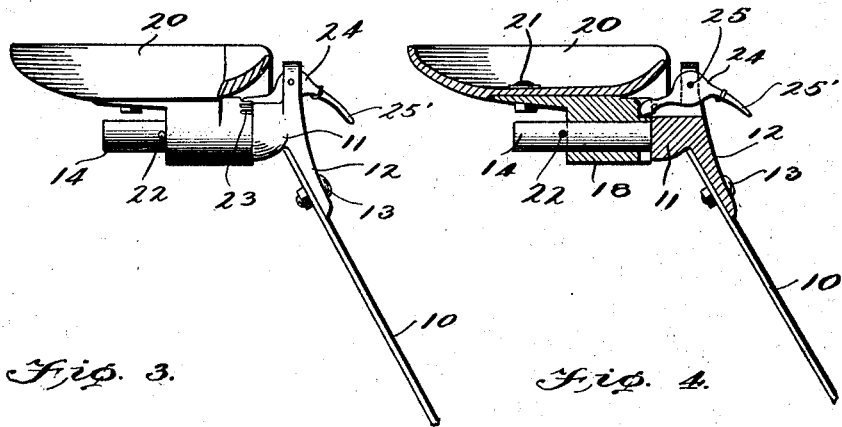
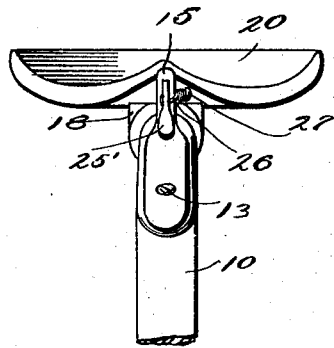
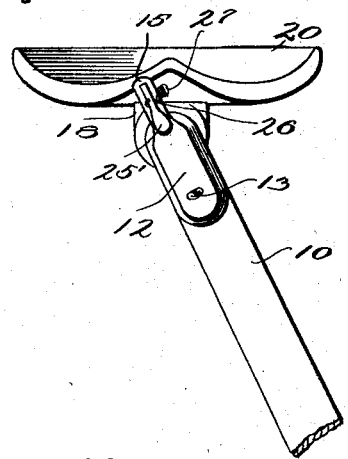
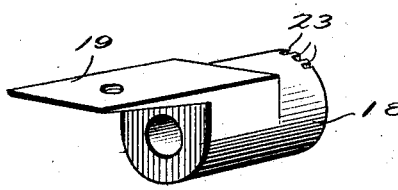
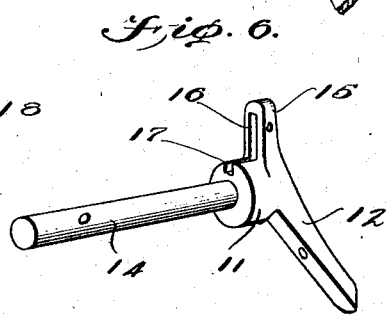
WITNESSES
INVENTOR
J. P. Eakin,
BY
ATTORNEYS

UNITED STATES PATENT OFFICE.

JOHN PIERCE EAKIN, OF JOLLYTOWN, PENNSYLVANIA.

ADJUSTABLE SEAT.

1,385,742.  Specification of Letters Patent.  Patented July 26, 1921.

Application filed April 9, 1921. Serial No. 459,897.

*To all whom it may concern:*

Be it known that I, John P. Eakin, a citizen of the United States, and a resident of Jollytown, in the county of Greene and State of Pennsylvania, have invented certain new and useful Improvements in Adjustable Seats, of which the following is a specification.

This invention relates to an adjustable seat.

As is well known in farming implements or the like a seat is usually provided for the driver or operator. This seat is supported by a strip of resilient metal which has its one end secured to the body or frame of the implement with which the seat is associated. The seat is of course rigidly secured at the upper end of the resilient strip of metal mentioned.

When using or operating implements of this character upon an incline or hillside, the seat will tip with the vehicle and make it difficult for the driver or operator to retain his seat.

It is therefore the object of the present invention to provide a suitable mounting for a seat of the character above referred to so that the same may be adjusted for being supported in a horizontal plane when the implement with which said seat is associated is operating on an incline or hillside.

Other objects will hereinafter appear.

The invention is illustrated by way of example in the accompanying drawings, in which—

Figure 1 is a side elevation showing the preferred form of mounting the seat to the resilient supporting strip, Fig. 2 is a central longitudinal sectional view of the same, Fig. 3 is a front elevation showing the manner in which the seat would appear when mounted in accordance with my invention and when the vehicle with which it is associated is traveling on level ground, Fig. 4 is a similar view but showing the position of the seat with respect to its supporting resilient strip when the vehicle is traveling along a hillside or an incline, Figs. 5 and 6 are detail views of the sleeve and stem means by which the seat is revolubly supported.

Referring to the drawings more in detail, 10 indicates a strip of spring metal which it will be assumed is rigidly secured at its lower end to the frame or body of a farming implement or the like. A seat supporting member 11 is provided having a downwardly extending arm 12 by which it may be secured to the strip 10 by means of bolts as shown at 13. The supporting arm 11 is likewise formed with a stem or spindle 14 and an upwardly extending arm 15, said arm 15 being formed with a central slot as indicated at 16. Also the member 11 is formed with a groove 17 which terminates at its one end in the slot 16 as shown in Fig. 6.

Upon the stem 14 there is journaled a sleeve or collar 18, said sleeve being formed with an extension plate-like member 19 upon which there is secured a seat 20 by the means of a suitable bolt as indicated at 21. The sleeve 18 is held against outward movement on the stem by a pin which extends transversely of the stem, as shown at 22. In the one end of the collar or sleeve 18 there is formed a plurality of notches 23 which are circumferentially arranged and preferably of the shape shown. The notches 23 are adapted to receive the inner end of the latch member 24, said latch being pivotally mounted in the slot 16 by the means of a pin as at 25, and also provided with a suitable handle as at 25′.

In order to hold the latch 24 in its locked position, a coil spring 26 is secured at its one end to a screw 27, said screw being threaded into the extension arm 16. The other end of the coil spring is suitably connected near the outer end of the latch member 24 and adapted to press the inner end of said latch member into engagement with the notches 23.

From the foregoing description it is believed the present invention will be understood. When the driver or operator wishes to arrange his seat so that the same will be disposed in a horizontal plane, he need only press downward on the handle 25′ of the latch 24 so that the inner end of said latch will be disengaged from the notch 23 in which it may extend. By his own motion the driver can then revolve the seat 20 until the same is in the desired position. The latch 24 may then be permitted to fall so that its inner end will then engage with one of the notches in the sleeve 18, and thereby lock the sleeve against further movement.

I claim:—

A seat mounting of the character described, comprising a stem having formed on its one end an enlargement with a downwardly extending portion adapted to be secured to a seat support, a sleeve journaled upon said stem, said sleeve having a plate extending from its one end adapted to support a seat, an upwardly extending member formed upon the enlarged portion of said stem, a latch member pivoted to said upwardly extending member and adapted to be brought into engagement with notches formed in the adjacent end of the sleeve whereby said sleeve may be adjustably held against turning movement upon said stem, and a spring associated with said latch and adapted for holding said latch in engagement with one of said notches.

JOHN PIERCE EAKIN.